J. J. TOOHEY.
LIQUID LEVEL INDICATOR.
APPLICATION FILED JUNE 13, 1914.

1,118,075.

Patented Nov. 24, 1914.

WITNESSES:
John Buckler,
J. Murphy

INVENTOR:
John J. Toohey
by Jas. H. Churchill
Atty.

UNITED STATES PATENT OFFICE.

JOHN J. TOOHEY, OF EVERETT, MASSACHUSETTS.

LIQUID-LEVEL INDICATOR.

1,118,075.

Specification of Letters Patent.

Patented Nov. 24, 1914.

Application filed June 13, 1914. Serial No. 845,007.

*To all whom it may concern:*

Be it known that I, JOHN J. TOOHEY, a citizen of the United States, residing in Everett, in the county of Middlesex and State of Massachusetts, have invented an Improvement in Liquid-Level Indicators, of which the following description, in connection with the accompanying drawings, is a specification, like characters on the drawings representing like parts.

This invention relates to an apparatus for indicating the level of a liquid in a tank or closed receptacle, and is herein shown as embodied in an apparatus especially adapted for indicating the level of the gasolene in the supply tank of an automobile, and particularly a supply tank located under the seat of the automobile.

The invention has for its object to provide a simple, efficient and inexpensive apparatus for the purpose specified.

The particular features of the invention will be pointed out in the claims at the end of this specification.

Figure 1:
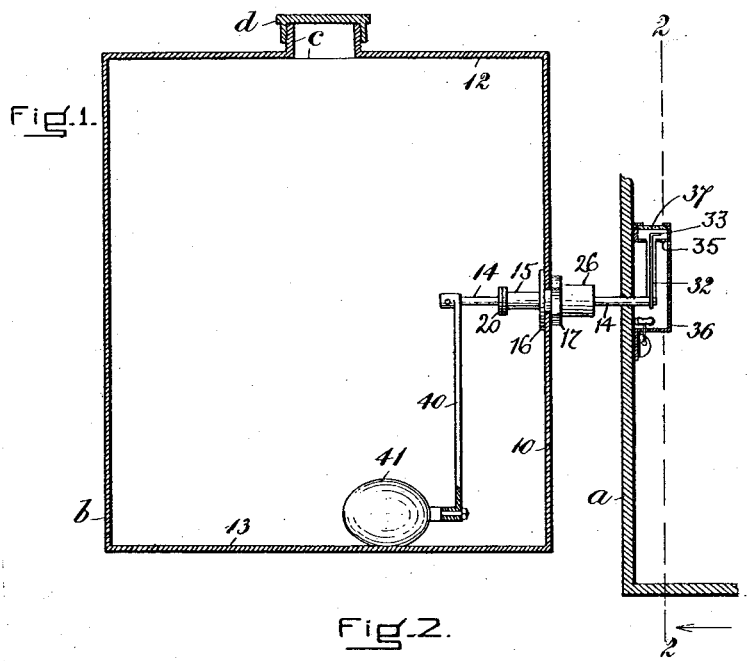
Figure 2:
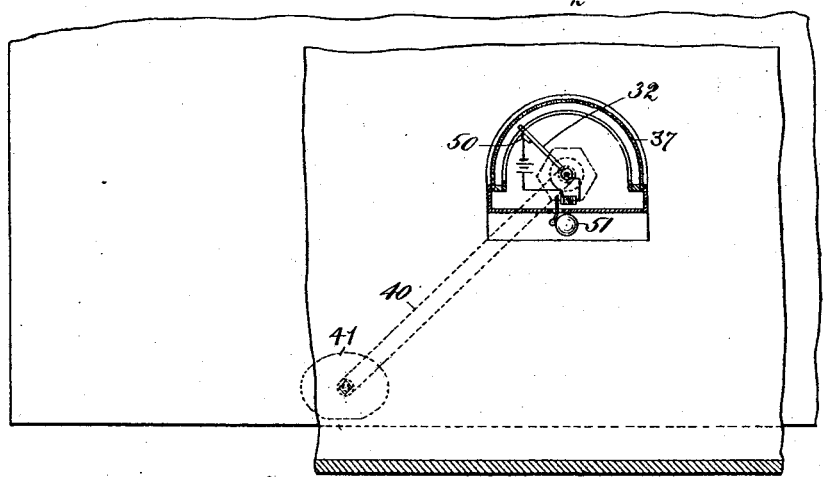
Figure 3:
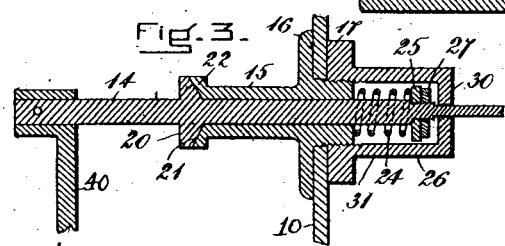
Figure 4:
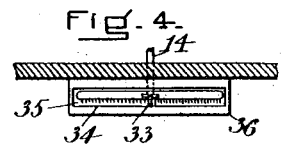

Figure 1 represents a sufficient portion of an automobile provided with an indicating apparatus embodying this invention, to enable it to be understood. Fig. 2, a section on the line 2—2, Fig. 1. Fig. 3, a detail in section on an enlarged scale of the indicator shaft shown in Fig. 1, and Fig. 4, a plan of the indicator shown in Fig. 1.

Referring to the drawings, $a$ represents the front upright wall or board of the chauffeur's seat of an automobile of known construction and such as now in general use, and $b$ represents the gasolene supply tank, which is located behind the wall $a$ and beneath the chauffeur's seat. The tank $b$ may be such as now commonly used and is provided with the inlet nozzle $c$, which is normally closed by the cap $d$. The tank $b$ in accordance with this invention has extended through its front upright wall or side 10, preferably midway of the top 12 and bottom 13 of the tank, a shaft 14, which is mounted to turn in a bearing sleeve or hub 15, provided with a flange 16, which is adapted to engage the inner surface of the wall 10, said hub having its front end extended through said wall and provided with screw threads to be engaged by a nut 17, which is designed to engage the outer surface of the wall 10 and coöperates with the flange 16 to firmly secure the bearing hub in fixed relation to said wall.

The shaft 14 is provided with an enlargement or collar 20, which coöperates with the inner end of the bearing hub 15 to form a fluid tight joint therewith, and said collar may be provided with a conical front surface 21, which engages a conical recess or seat 22 in the end of the hub 15, and both of these surfaces may and preferably will be ground to fit fluid tight, and thus prevent leakage of gasolene out of the tank $b$ along the shaft 14. The ground collar 20 is held to its seat by a helical spring 24, which encircles the shaft 14 outside of the tank and bears at one end against the front end of the hub 15 and at its other end against a nut 25 on the shaft 14. The tension or pressure of the spring 24 may be regulated by means of the nut 25, which may be locked in its adjusted position by the nut 27. The front end of the shaft 14 is preferably reduced in diameter and is extended through the end wall or head 30 of a sleeve 26, secured to or forming part of the nut 17, and is also extended through the upright wall $a$ of the seat and has fast to it a pointer 32, which may be provided at its free end with a finger 33, see Fig. 4, which is movable over a scale 34 on a curved plate or strip 35, which is secured to or forms part of a casing 36 secured to the wall $a$ and provided with an opening in its top which is normally closed by a glass 37.

The shaft 14 within the tank $b$ has fastened to it a crank or arm 40, having secured to its lower end a float 41, and said arm is made long enough, so that it extends from a vertical line through the shaft 14 at an angle of about 45°, when the float 41 rests on the bottom of the tank, and by locating the shaft about midway of the height of the front wall of the tank, the movement of the float 41 and of the arm 40 is limited to about 90°, the bottom wall 13 of the tank forming a stop for the downward movement of the float, and the top wall 12 forming a stop for the upward movement thereof.

In operation, the float 41 rises and falls with the liquid contents of the tank, and thereby rotates the shaft 14 so as to move the pointer over the scale and thus indicate the level of the liquid in the tank, the pointer 32 being visible to the chauffeur.

Provision may and preferably will be made for notifying the chauffeur when the level of the liquid or gasolene has been lowered to a predetermined point, and for this purpose the pointer 32 is adapted to engage a flat spring 50 on the downward movement of the float, said pointer and spring being included in circuit with a magnetically operated bell 51. By removing the pointer 32, and the nuts 25, 27 from the shaft 14, the latter can be pushed into the tank, and then removed therefrom through a suitable hand hole (not shown) in the top thereof, if it should be desired to remove the float and shaft from the tank, and in assembling the apparatus, the float and shaft 14 may be inserted through said hand hole into the tank and the shaft pushed out through the bearing hub 15.

Claims:

1. The combination with a tank for containing a liquid, of a bearing sleeve extended through a side wall of said tank substantially near the vertical center thereof, a shaft extended through said bearing sleeve and provided with a collar which coöperates with the end of the bearing sleeve within the tank, means for holding the said collar into engagement with said sleeve to make a fluid tight joint therewith, a nut engaging the threaded end of the sleeve outside of the tank, a crank or arm fastened to the end of the shaft within the tank and extended from said shaft at an angle thereto, a float attached to said crank, a pointer attached to the shaft outside of said tank, and a scale with which said pointer coöperates, substantially as described.

2. The combination with a tank for containing a liquid, of a bearing sleeve extended through a wall of said tank and provided with a flange to bear against the inner side of the tank, and with a threaded end extended outside of the tank, a nut engaging said threaded end and the outside of the tank to draw the flange against the side wall of the tank, a shaft extended through said sleeve and provided with a collar which coöperates with the end of the sleeve within the tank; means for holding the said collar into engagement with said sleeve to make a fluid tight joint therewith, a float connected with the shaft within the tank to effect rotation thereof, and an indicator connected with the portion of the shaft outside of said tank.

3. The combination with a tank for containing a liquid, of a bearing sleeve having a screw-threaded end extended through a wall of said tank, to the outside thereof, and having a flange between its ends to bear against a side wall of the tank within the latter, a nut to engage the threaded end of the sleeve outside of the tank, a shaft extended through said sleeve, means for making a fluid-tight joint between the said shaft and sleeve, a float connected with the shaft within the tank to effect rotation thereof and an indicator connected with said shaft, substantially as described.

In testimony whereof, I have signed my name to this specification in the presence of two subscribing witnesses.

JOHN J. TOOHEY.

Witnesses:
JAS. H. CHURCHILL,
J. MURPHY.